Patented Jan. 14, 1936

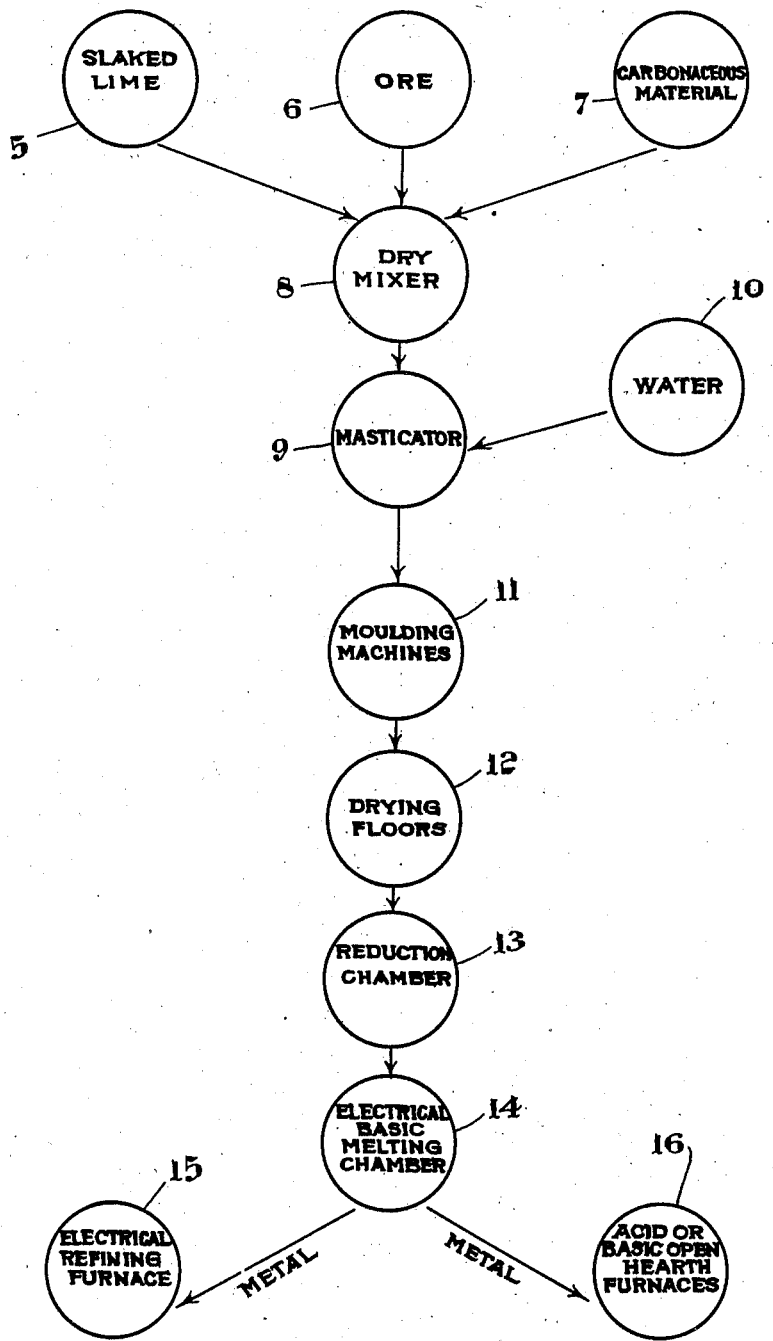

2,028,105

UNITED STATES PATENT OFFICE 2,028,105

METHOD OF PRODUCING SPONGE IRON

Casimir J. Head, Montreal, Quebec, Canada

Application August 28, 1933, Serial No. 687,195. Renewed June 3, 1935. In Great Britain September 7, 1932

7 Claims. (Cl. 75—14).

This invention relates to a method of producing metallic iron sponge for conversion into high grade ingot iron or steel and its principal object is the elimination or fixing of the deleterious element sulphur during the reduction which is carried out at a temperature below the fusion point of the iron oxides.

An important feature of the present invention is the provision of a simple and inexpensive method in which the sulphur is fixed as an alkaline earth sulphide during the reduction without using carbonaceous matter in such quantity as to leave an excess of the carbonaceous matter at the end of the reduction period.

A further feature is the provision of a simple and inexpensive method in which the fixing of the sulphur as an alkaline earth sulphide during the reduction of the iron oxides is so accomplished that no difficulty is experienced in freeing the reduced metal from the sulphur by a subsequent melting operation.

A further feature is the provision of a method in which the fixing of the sulphur is so accomplished that the melting of the metallic iron sponge to free it from the sulphur may be resorted to immediately at the end of the reduction period, or may be delayed for a considerable period of time, provided that, in the latter instance, the reduced metallic iron sponge is cooled off in the presence of a reducing gas to prevent oxidation of the reduced iron and decomposition of the alkaline earth sulphide.

A further feature is the provision of a generally improved process for the production of substantially sulphur-free ingot iron or steel which lends itself to the substitution of low grade bituminous fuels or lignites (having high sulphur content and holding heavy hydro-carbons) in place of the more expensive charcoal, coke or anthracite usually required for the processes now in use. In addition to being cheaper the low grade bituminous fuels which it is possible to use in accordance with my process are of advantage, in that volatilization of the heavy hydro-carbons by heat in the presence of iron, which acts as a catalyst, causes the volatile matter to be decomposed into its component parts carbon and hydrogen, thus facilitating reduction, and aiding in the fixing of the sulphur.

A further feature is the provision of a method in which the iron oxide ore is mixed with carbonaceous material and air-slaked lime to form briquettes from which a certain amount of tenaciously held combined water is slowly evolved during the reduction period. This combined water ($H_2O$) upon being given off as vapour in the presence of incandescent carbonaceous material or incandescent iron present in the reducing chamber becomes decomposed into its component parts hydrogen and oxygen. The hydrogen gas thus evolved provides a very active and efficient agent for fixing the sulphur as an alkaline earth sulphide in such manner that the metal separated from the slag forming ingredients by subsequent melting of the reduced iron sponge is practically free of sulphur. The hydrogen gas which is thus made available in the reducing chamber is of further advantage in that it combines with some of the phosphorous content of the mix and is liberated as phosphoretted hydrogen which passes off with the waste gases.

I am aware that it has been proposed to produce metallic iron sponge by reducing iron oxide ores in the presence of solid carbonaceous matter and oxides of the alkaline earths at a temperature below the point of fusion of the iron oxide ore. In such processes it has also been proposed to fix the sulphur as an alkaline earth sulphide by using an excess of carbonaceous material, so that a considerable amount of the carbonaceous matter remains with the reduced metallic iron sponge after reduction is completed. Such methods require the use of high grade materials and would only be applicable in the case of the metallic iron sponge being melted for cast iron. Moreover in the case of conversion of the sponge into low carbon ingot iron or steel after the reduction is completed in accordance with this process, the reduced metallic iron sponge must be cooled off and the excess carbonaceous matter removed. This last procedure is well known to metallurgists to offer insuperable difficulties, owing to the physical characteristics of the reduced metallic iron sponge.

I am also aware of the fact that, in certain localities where the cost of electrical energy is relatively low, it has been proposed to feed air dried or heated briquettes, containing lime as a binder and sulphur fixing agent, directly into an electrical melting chamber at a working temperature of about 1800° C., without any previous low temperature reduction of the briquettes. Owing to the relatively high temperatures employed in this process any combined water that may be held in the briquettes is quickly converted into vapour and discharged with the waste gases without doing any useful work as regards assisting in the reduction, or in the fixing of the sulphur. Even when carried out under the best conditions this process involves an expenditure of electrical energy of approximately 2500 K. W. hours per ton of steel produced owing to the fact that it requires twice as much heat, measured in calories or kilowat hours, to effect reduction as is required for fusion which, of course prohibits its adoption in localities where electrical power is quite expensive. Moreover, the metallic iron yielded by this process contains a considerable amount of the sulphur originally present in the raw materials, and must be subjected to further refining to bring the sulphur content within tolerant limits.

The method which I have developed eliminates the aforesaid difficulties while producing a metal practically free from sulphur. It also lends itself to either continuous or intermittent working and requires only a relatively small expenditure of electrical energy for the melting of the iron sponge after reduction is completed.

Proceeding now to a more detailed description reference will be had to the accompanying drawing wherein the figure is a flow sheet illustrating the sequence of operations characterizing my improved method.

When reducing magnetites or other hard compact iron oxides I usually mill them to at least minus 60 mesh but, in the case of the softer or more porous variety of iron oxides minus 40 or 30 mesh may suffice. However, no hard or fast rule can be laid down in this respect, since each mineral must be treated according to its physical properties, and tried out to determine the degree of milling that would yield the best results. With the ground iron oxide ore, I mix a quantity of carbonaceous material in such proportion as to maintain during the reduction period the equilibrium or relation between the carbon monoxide and the carbon dioxide gases formed during reduction at 2:1. When employing graphite, anthracite or other hard compact carbonaceous material I prefer to use them in the finest practicable state of division. On the other hand charcoal, cokebreeze and lignites, being of a porous nature, offer more surface for contact and do not require such fine milling. With the mixture of finely divididied ore and carbonaceous material I incorporate air-slaked lime in sufficient quantity to serve as a binder and to maintain the slag forming ingredients of the mix in a strongly basic condition. If the iron oxide ore is deficient in acid elements a small proportion of silica sand or portland cement is preferably added to the mix to ensure the desired chemical reaction between the alkaline hydrate and the acid content of the mix. I have also found it beneficial in some instances to add iron or steel turnings or drillings to the mix in a quantity not exceeding ten per cent by weight of the iron oxide.

The foregoing ingredients, after being thoroughly mixed together, are delivered to a masticator where sufficient water is added to bring the whole mass to a consistency such that it may be readily formed into pieces such as lumps, blocks, or briquettes. These lumps, blocks or briquettes hereinafter termed "moulded pieces" are then allowed to dry without application of heat until they are sufficiently set and fit for reduction. This usually requires from five to seven days but I have discovered that further aging of the moulded pieces prior to reduction has important results. The increased time allowed for the reaction between the alkaline hydrate and the acid content of the mix gives improved results with regard to binding the ingredients together, and also causes the water that enters into chemical combination to be more tenaciously held in the moulded pieces during subsequent reduction which is accomplished in suitable retorts or receptacles heated to a temperature below the point of fusion of the iron oxide ore. During such reduction the combined water content of the moulded pieces is slowly driven off in the form of water vapour. This water vapour, being evolved in intimate contact with the heated reduced metallic iron sponge or coming in contact with the steel walls of the reduction chamber or with any turnings or drillings incorporated in the mix or in contact with the incandescent carbonaceous matter present becomes decomposed into its components, hydrogen and oxygen. It will thus be seen that the moulded pieces are utilized as an economical medium for introducing the very active and efficient reducing agent hydrogen gas which serves to fix the sulphur as an alkaline earth sulphide as may be expressed by the following reactions:—

In the presence of incandescent iron (1)    $Ca(OH)_2 + Fe = FeO + CaO + H_2$

Hydrated lime + iron =
    oxide of iron + lime + hydrogen (2)    $CaO + H_2 + S = CaS + H_2O$ Lime + hydrogen + sulphur =
    calcium sulphide + water as dulphides (3)    $CaO + 4H_2 + SO_3 = CaS + 4H_2O$ Lime + hydrogen + sulphur =
    calcium sulphide + water as sulphates In the presence of incandescent carbonaceous material (4)    $CaO.OH_2 + C = CO + H_2 + CaO$ Hydrated lime + carbon =
    carbon monoxide + hydrogen + lime (5)    $CaO + H_2 + S = CaS + H_2O$ Lime + hydrogen + sulphur =
    calcium sulphide + water It will be noted that the water vapour driven off during the progress of the several reactions provides a further supply of hydrogen as it comes in contact with the heated iron or incandescent carbonaceous matter. Some of the oxygen liberated during the course of reaction (1) may go to form a scale of oxide of iron which would be reduced by either the carbon monoxide or hydrogen gases present in the reduction chamber, thus affording a very desirable cycle reaction.

It may also be pointed out that the hydrogen gases derived from the water vapour driven off from the moulded pieces serves to liberate some of the phosphorous content of the moulded pieces as phosphoretted hydrogen which passes off with the waste gases. The melting of the metallic iron sponge after completion of the reduction, yields a metal which is sufficiently free from sulphur to eliminate the necessity of further refining as regards sulphur content. The sulphur content of metal produced in accordance with this method is below 0.025 per cent.

The method described in the foregoing lends itself to either continuous or intermittent working. For continuous working air dried moulded pieces are suitably fed through hoppers into externally heated retorts or other suitable receptacles constructed of heat resisting nonsealing steel. These retorts are kept at a constant temperature of from 800 to 975° C. and are suitably connected to an electrical melting chamber. After reduction is completed to conserve the heat stored in the metallic iron sponge it is transferred from the reducing chamber directly into the electrical melting chamber which contains a bath of molten metal. The purified molten metal may be withdrawn from the melting chamber and may be immediately utilized as ingot iron, but if this molten metal is to be used in the production of steel it is preferable to transfer a portion thereof from the melting chamber to an electrical refining furnace working under acid or basic conditions as circumstances may demand where the metal may be finished off to any definite grade of composition of steel according to practices well known in this art.

In the case of intermittent working the moulded pieces after being reduced in suitable heat resisting receptacles are cooled in a separate cooling chamber in an atmosphere of reducing gas so that oxidation of the reduced iron and decomposition of the fixed alkaline earth sulphide is prevented during the cooling period. When cold, the moulded pieces may be stored and held in suitable receptacles for a considerable period of time without deterioration. The subsequent melting of the cold metallic iron sponge for the recovery of the metal, may be accomplished in either basic open-hearth furnaces, or in any suitable form of electrical furnace working under basic conditions.

Should iron or steel turnings or drillings be incorporated in the moulded pieces they will necessarily be charged into the melting chamber along with the reduced metallic iron sponge, which drillings having a lower melting point than that of the reduced iron sponge, will tend to absorb or collect the fine particles of metal melting out from the reduced sponge, thus effecting a further saving of time in the recovery of the purified metal while preventing possible loss by oxidation.

In my process as herein described I make use of air-slaked lime in preferance to the use of freshly burnt lime, or milk of lime, since air-slaked lime can be more thoroughly incorporated throughout the mix in its correct proportion. Further aging of the moulded pieces facilitates the more effective chemical reaction between the alkaline hydrate and the acid content of the mix so that the water of combination is so tenaciously held within the moulded pieces as to be vaporized only at a slow and gradual rate during reduction, with the beneficial results already described.

As illustrated by the accompanying flowsheet diagram, the slaked lime, ore and carbonaceous material are initially placed in separate hoppers indicated at 5, 6, and 7. These materials are delivered from their respective hoppers to a dry mixer 8 where they are thoroughly mixed together, the resulting mixture being then delivered to the masticator 9, where sufficient water is added from the tank 10 to bring the whole mass to a consistency such that it may be readily formed into pieces such as lumps, blocks or briquettes by the moulding machine 11 to which the mass is delivered from the masticator. When removed from the moulding machines the moulded pieces are placed on the drying floors 12 where they are allowed to dry, without the application of heat, for a minimum period of five days. The moulded pieces are then charged into the reducing chamber 13 where the reduction takes place under the conditions previously described. From the reducing chamber the metallic iron sponge is transferred directly into the melting chamber 14 from which the purified metal may be withdrawn into an electrical refining furnace 15 or into an acid or basic open hearth furnace 16.

Having thus described my invention, what I claim is:—

1. A method of producing iron sponge which comprises mixing iron oxide ore with carbonaceous material and slaked lime, adding water, forming the mixture into briquettes, and aging the briquettes, in the absence of heat, for a period not less than five days to allow of the more effective chemical reaction between the alkaline hydrate and the acid content of the mix to take place, thus ensuring a slow and gradual evolution of the tenaciously held combined water from the briquettes during subsequent reduction thereof.

2. A method of producing iron sponge which comprises mixing iron oxide ore with carbonaceous material and slaked lime, adding water to the mixture, forming the mixture into briquettes, drying the briquettes, in the absence of heat, for a relatively long period prior to reduction, and effecting reduction of the briquettes in a reducing chamber at a temperature below the fusion point of the iron oxide ore.

3. A method of producing iron sponge for conversion into ingot iron or steel which comprises mixing iron oxide ore with carbonaceous material and slaked lime, adding water to the mixture, forming the mixture into briquettes, drying the briquettes, without application of heat, for a relatively long period of time prior to reduction, effecting reduction of the dried briquettes in a reducing chamber externally heated to a temperature below the fusion point of the iron oxide ore, and melting the metallic iron sponge to free the metal from sulphur and from the slag forming ingredients, said method being characterized by the fact that the tenaciously held combined water is slowly driven off from the briquettes during reduction and is decomposed into its component parts oxygen and hydrogen by the action of heated iron or incandescent carbonaceous matter present in the reducing chamber.

4. A method of producing iron sponge which comprises mixing iron oxide ore with carbonaceous material and air-slaked lime, adding water to the mixture, forming the mixture into briquettes, drying and aging the briquettes without application of heat, for a sufficiently long period to provide for the slow evolution of the combined water content of the briquettes during subsequent reduction thereof, effecting reduction of the briquettes at a temperature below the fusion point of the iron oxide ore in a reducing chamber in which sufficient iron is present to act as a catalyst for decomposing the water vapour given off by the briquettes into its component parts oxygen and hydrogen whereby the sulphur of the raw materials is fixed as an alkaline earth sulphide by the action of the hydrogen gas thus evolved.

5. A method of producing sponge iron which consists in forming briquettes comprising a mixture of iron oxide ore, carbonaceous material and air-slaked lime and effecting reduction of the briquettes in a reducing chamber heated to a temperature below the fusion point of the iron oxide, said method being characterized by the slow evolution of water vapour from the briquettes throughout the reduction period.

6. A method of producing iron sponge which consists in forming briquettes comprising finely divided iron oxide ore mixed with carbonaceous material and air-slaked lime, aging the briquettes for a relatively long period so that, during subsequent reduction of the briquettes in a closed retort or other receptacles at a temperature below the fusion point of the iron oxide, the combined water of the briquettes is slowly driven off in the form of water vapour which, by contact with the iron present in the retort or receptacle or by contact with the incandescent carbonaceous material also present is decomposed into its component parts, oxygen and hydrogen, said process being characterized in that the hydrogen gas thus evolved serves to fix the sulphur of the raw materials as an alkaline earth sulphide in accordance with the following reactions.

(1) $Ca(OH)_2 + Fe = FeO + CaO + H_2$
(2) $CaO + H_2 + S = CaS + H_2O$
(3) $CaO + 4H_2 + SO_3 = CaS + 4H_2O$

7. A method of producing substantially sulphur free ingot iron or steel in which moulded pieces, comprising a combination of iron oxide ore, slaked lime and carbonaceous material, are aged in the absence of heat for a sufficient period to allow of the chemical reaction between the acid and alkaline content of the moulded pieces to take place and are then reduced in a closed retort at a temperature below the fusion point of the iron oxide ore, whereby the chemically combined water held by the moulded pieces is brought into useful effect for fixing of the element sulphur and its subsequent removal by melting as herein described.

CASIMIR J. HEAD.